Sept. 26, 1939.　　　S. A. MOREHOUSE　　　2,173,913
CONTROL SYSTEM
Original Filed July 22, 1935　　3 Sheets-Sheet 3
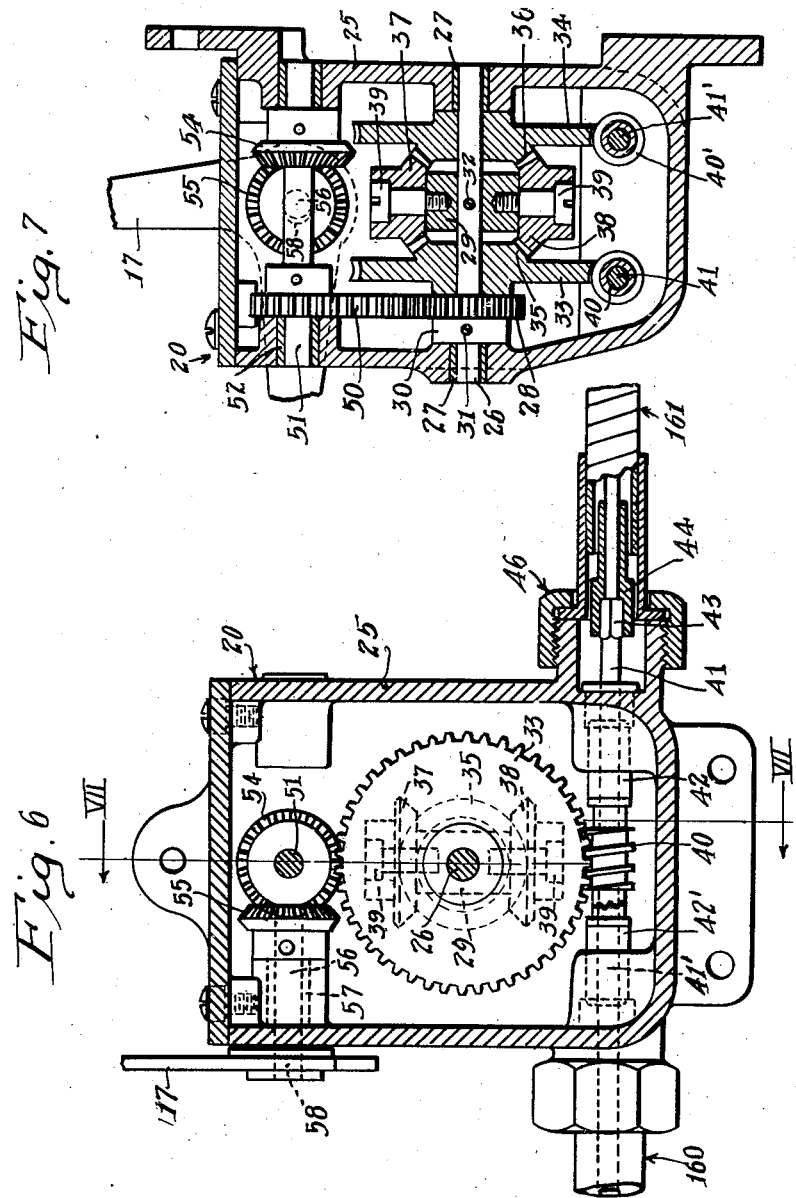
INVENTOR.
Silas A. Morehouse
BY Lyon & Lyon
ATTORNEYS Patented Sept. 26, 1939

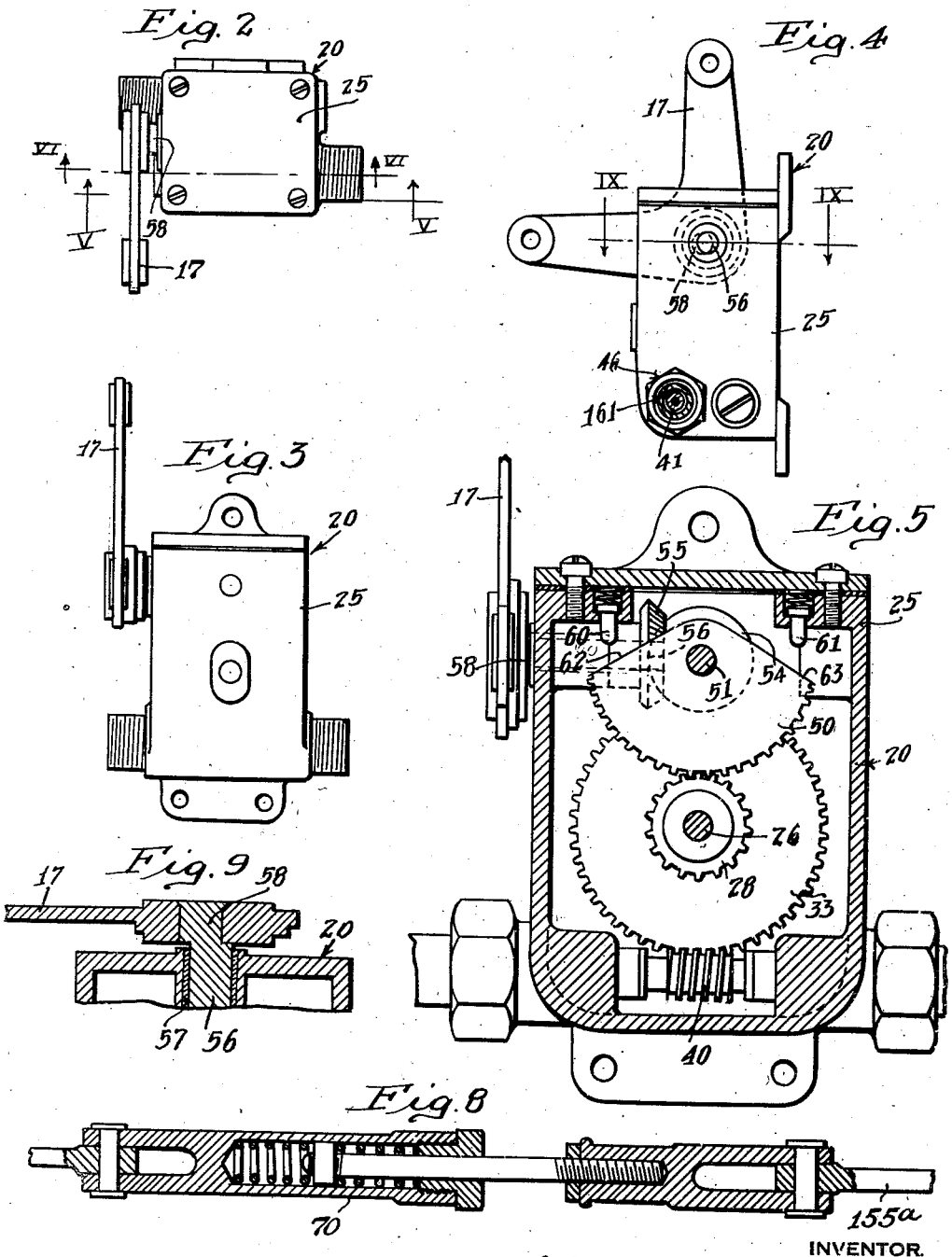

2,173,913

UNITED STATES PATENT OFFICE 2,173,913

CONTROL SYSTEM

Silas A. Morehouse, Glendale, Calif., assignor, by mesne assignments, to United Aircraft Corporation, East Hartford, Conn., a corporation of Delaware Original application July 22, 1935, Serial No. 32,575. Divided and this application January 18, 1937, Serial No. 121,091

5 Claims. (Cl. 170—135.6)

This invention relates broadly to control systems for automatically maintaining two or more rotating devices at predetermined relative speeds and is particularly applicable to the control of engines in multi-engine airplanes, motor boats, and the like where the different engines are not connected to a common shaft but nevertheless should run at the same speed.

This application is a division of my application Serial No. 32,575 filed July 22, 1935.

An object of the invention is to provide a practicable mechanism for maintaining a plurality of engines in a predetermined desired speed relation.

A more specific object is to provide a mechanism for maintaining exact synchronism between the various motors of a multi-motor airplane equipped with variable pitch propellers for maintaining exact synchronism in the speeds of the various motors without changing the normal control of the motors or necessitating any attention on the part of the operator.

Various more specific objects, features and advantages of the invention will be apparent from the following detailed description which refers to the drawings.

The system of the present invention has been specifically designed for airplanes and for that reason the invention will be explained by describing the specific application thereof to an airplane.

In the drawings:

Fig. 2 is a plan view of a preferred form of synchronizing unit in accordance with the invention.

Fig. 3 and Fig. 4 are side and end views, respectively, of the device shown in Fig. 2.

Fig. 5 is a cross section through the mechanism shown in Fig. 2, the section being taken in the plane V—V of Fig. 2.

Fig. 6 is a cross section through the device shown in Fig. 2, the section being taken in the plane VI—VI of Fig. 2.

Fig. 7 is a sectional view taken at right angles to the section of Fig. 6 in the plane VII—VII of Fig. 6.

Fig. 8 is a detail view of a safety link adapted to be inserted in the linkage employed with my unit.

Fig. 9 is a detailed section in the plane IX—IX of Fig. 4.

Figure 1:
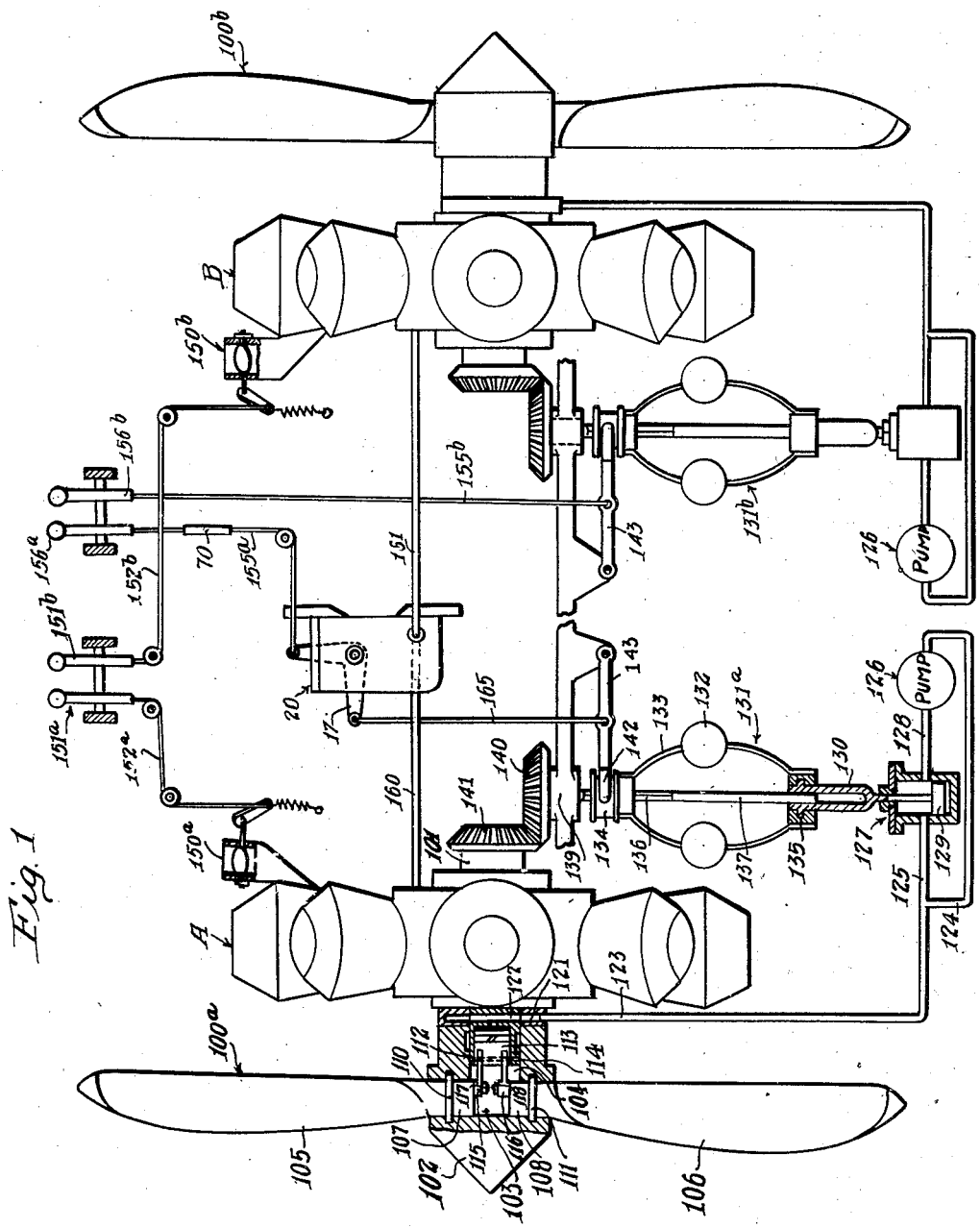
Fig. 1 is a schematic diagram illustrating the application of the invention to the two engines of a bi-motor airplane equipped with variable pitch propellers.

In Fig. 1, two engines A and B, respectively, are directly connected to variable pitch propellers 100a and 100b, respectively. Each engine is provided with a driving connection to its associated propeller and a mechanism for shifting the pitch of the propeller. This mechanism will be described in detail with reference to the sectional view of the mechanism on motor A. Thus the motor is provided with a shaft 101, to which is keyed a propeller hub 102, the hub having a bore 103 extending diametrically therethrough and a longitudinal bore 104 into which the end of the engine shaft 101 projects. Each propeller blade 105 and 106, respectively, is provided with a cylindrical stub 107 and 108, respectively, which are rotatably mounted in the bore 103 with their inner ends juxtaposed to each other. Radial movement of the propeller blades 105 and 106 is prevented by rings 110 and 111, respectively, on the stubs of the blades. The forward end of the shaft 101 is bored to define a cylinder 112 in which a piston 113 is fitted. This piston 113 is provided with a wrist pin 114 upon which are mounted two connecting rods 115 and 116, respectively, the outer ends of which are pivotally mounted on pins 117 and 118, respectively, which are eccentrically mounted on the inner ends of the propeller stubs 107 and 108, respectively. The pins 117 and 118 are so disposed on their respective hubs that forward movement of the piston 113 twists the propeller blades in opposite directions to simultaneously increase their pitch. When the propeller is rotating, the reaction of the air thereon tends to reduce the pitch of the blades and force the piston 113 rearwardly. This force is opposed by oil under pressure which is supplied to the inner end of the cylinder 112 through passages 121 in the engine shaft 101, which communicate with a passage 122 in a collar surrounding the shaft. The passage 122 in turn connects with an oil line 123 extending to and connecting with two oil lines 124 and 125.

Pipe 124 extends directly to the output connection of a pump 126 and pipe 125 connects through a valve 127 with a pipe 128 which connects to the inlet connection of pump 126. The pump 126, which may be driven from the engine or from any other suitable source of power, circulates oil continuously around through pipes 124 and 125, the valve 127 and pipe 128 and the pressure of the oil at the juncture between pipes 124 and 125 is transmitted through pipe 123 to the piston 113. Instead of employing the particular pump and pipe connections and valve just described, and diagrammatically shown in Fig. 1, other arrangements known in the prior art may be employed.

The valve 127 comprises a piston 129 attached to a control shaft or rod 130 and forms a part of a governor 131a. Thus the governor comprises a pair of weights 132 mounted upon resilient arms 133 which are secured at their upper and lower ends to collars 134 and 135, respectively. The collar 135 is rotatably mounted upon the upper end of the rod 130 and is provided with a groove fitting over a flange on rod 130 so that vertical movement of the collar 135 is transmitted to the rod 130 to open or close the valve 129. The upper collar 134 is mounted upon a square portion 136 of a rotatable shaft 137, the lower end of which is journaled in the counter-bored end of the rod 130 and the upper end of which is rotatably mounted in a stationary bearing 139.

The shaft 137 is rotated from the engine A through bevel gears 140 and 141 secured to the upper end of shaft 137 and the rear end of the engine shaft 101, respectively. The collar 134 is slidable vertically along the square portion 136 of shaft 137 and is supported in position by a yoke 142 on the end of a lever 143, which lever is shifted up and down to vary the setting of the governor.

In operation as the engine is accelerated, the governor weights 132 fly out, thereby lifting the collar 135 and the valve 129 to interrupt or reduce the flow of fluid through pipe 125. This increases the pressure of the fluid, which pressure is applied to the inner end of the piston 112, forcing the latter out to increase the pitch of the propeller. The increase in pitch of the propeller increases the load on the engine, tending to slow the latter down so that at any given throttle opening of the engine the pitch of the propeller is automatically adjusted to increase the load sufficiently to hold the engine and propeller at a substantially constant speed irrespective of the throttle opening. It is understood, however, that there must be some slight increase in speed as the throttle is opened as some movement of the governor is necessary to operate the valve 129.

The mechanism for varying the pitch of the propeller 100b and thereby governing the speed of the engine B is substantially the same as that described in connection with engine A and propeller 100a. However, it is practically impossible to so design the two units as to cause them to automatically maintain exactly the same speed despite differences in the throttle settings of the two engines. It will be observed that throttle valves 150a and 150b on the two engines A and B are manually controlled by throttles 151a and 151b which are connected to their associated valves by cables 152a and 152b, respectively.

Heretofore it has been necessary to synchronize the two engines by manually varying the settings of the governors. Thus the lever 143 associated with the governor 131b is shown connected by a control cable 155b directly to a governor control lever 156b. In accordance with prior practice the lever 143 associated with governor 131a would also be similarly directly connected to a control lever 156a. However, in accordance with the present invention, I automatically vary the setting of the governor 131a to bring the two engines into synchronism, by inserting a governing device 20 in the connection between the lever 143 on governor 131a and the control lever 156a.

This control device 20 is connected by tachometer shafts 160 and 161 to engines A and B respectively, and is provided with a bell crank lever 17, one arm of which is connected to the rod or cable 165 extending to the lever 143, and the other arm of which is connected to the cable 155a extending to the control lever 156a.

To automatically change the setting of the governor 131a, the fulcrum of bell crank lever 17 is shifted by the device 20 in response to a difference in speeds of the two tachometer shafts 160 and 161, the fulcrum of the bell crank lever 17 being shifted upwardly or downwardly to thereby shift the cable or rod 165 and the lever 143 without shifting the associated control member 156a.

Referring now to Figs. 2 to 7, inclusive, the unit 20 comprises a casing 25 having rotatably mounted therewithin a shaft 26. Thus as shown, shaft 26 is mounted in bearing bushings 27 in opposite walls of the casing. The shaft 26 has keyed thereto a gear 28 and a differential hub 29. The gear 28 is provided with a hub 30 having a set screw 31 therein for locking it to shaft 26. The differential hub 29 likewise has a set screw 32 therein for locking it to shaft 26 after the parts have been assembled together.

Rotatably mounted upon shaft 26 on opposite sides of the hub 29 are a pair of worm wheels 33 and 34, respectively, each of which has secured thereto a bevel gear 35 and 36, respectively, which bevel gears mesh with bevel gears 37 and 38, respectively, mounted for rotation about their axes on the hub 29 by screws 39, the gears 35, 36, 37 and 38 constituting a differential mechanism of well known type. The worm wheel 33 meshes with a worm 40 mounted on a shaft 41 which is rotatably supported at opposite ends in bushings 42 in the casing 25.

One end of shaft 41 projects through its associated bushing 42 and is provided with a squared end 43 adapted to engage a square socket 44 on the end of the tachometer shaft 161 shown in Fig. 1. A conventional connection 46 may be employed to secure the housing of the tachometer shaft to the casing 25.

The worm wheel 34 engages a worm 40' mounted on a shaft 41', mounted in bushings 42' in the housing 25. This shaft 41' is also provided with a squared end which projects, however, from the opposite end of the housing 25 to that from which the shaft 41 projects, this arrangement being clearly shown in Fig. 2. The purpose of bringing the shafts 41 and 41', respectively, out of the casing 25 on the opposite ends thereof is to cause the worm wheels 33 and 34 to be driven in opposite directions when their associated shafts 41 and 41' are connected to tachometer shafts rotating in the same direction. It will be obvious that if the worm wheels 33 and 34 are rotated in opposite directions at equal speeds, the differential gears 37 and 38 will simply rotate about their pivot screws 39 and no rotation of hub 29 and shaft 26 will occur. However, should the wheels 33 and 34 be rotating in opposite directions at different speeds, then a differential motion will be transmitted to the shaft 26, which differential motion is used in a manner to be described to control the speeds of the engines.

The gear 28 meshes with a gear 50 locked to a shaft 51 which is rotatably mounted in bushings 52 in the housing 25. The shaft 51 also has locked thereto for rotation therewith a bevel gear 54 which meshes with a bevel gear 55 locked to a shaft 56 which is rotatably mounted and projects through a bushing 57 anchored in the wall of the casing 25, the shaft 56 having on its outer end an eccentric stub shaft 58 which constitutes the pivotal mounting for the bell crank lever 17.

The operation of the mechanism 20 to correct a discrepancy in speed between the two motors, the tachometer shafts of which are connected to that mechanism, will now be apparent. Thus any difference in the speeds of the two tachometer shafts 160 and 161 will cause the worm gears 33 and 34 to travel in opposite directions at different speeds which will result in a slow rotation of the differential hub 29 and shaft 26. This in turn rotates the gear 28 which rotates the gear segment 50, the latter rotating the shaft 51 and gear 54, which in turn rotates gear 55 and shaft 56 to raise or lower the eccentric stub shaft 58, thereby raising or lowering as a whole the bell crank lever 17 mounted on unit 20 and shifting the associated lever 143 to change the setting of the associated governor 131a. Obviously the initial orientation of the stub shaft 58 must be such as to produce a compensating effect, i. e., lower the speed of the engine, the tachometer shaft of which is rotating at too high a speed.

In the arrangement as described in Fig. 1, approximate synchronism between the two engines may be initially established by adjusting one or the other of the control levers 156a or 156b. Thereafter the control element 20 operates automatically to shift the lever 143 on governor 131a to change the setting of the latter and thereby change the speed of engine A to correct any variation in synchronism between the two engines.

It is common in airplane practice to frequently, either unintentionally or intentionally, run one engine at a radically different speed from another for a period, as when testing. Therefore if special means were not provided to prevent such action, the gear segment 50 would quickly run out of mesh with the gear 28 and the device would be inoperative. To prevent such occurrence, spring stops are provided for limiting motion of the gear segment 50. These stops comprise a pair of spring detents 60 and 61, respectively, which engage the radial edges 62 and 63 of the gear segment 50 just before the latter passes out of mesh with the gear 28. This does not prevent the segment from passing out of mesh with gear 28 but resiliently urges the gear segment back into mesh so that normal driving relation between gear 28 and the segment 50 is reestablished as soon as the direction of gear 28 is reversed. However, as long as the gear 28 rotates in a direction tending to force the segment 62 against one of the stops 60 or 61, the teeth of the gear 28 merely click against the last teeth on the segment 50. The arrangement described makes it impossible to in any way damage the automatic synchronizing equipment by independently rotating one of the engines at a different speed from the others.

If the levers 156a and 156b have a full range of motion sufficient to shift the associated levers 143 through their full ranges of movement when the automatic control mechanism is in neutral position, then when the latter is out of neutral position the range of motion of the associated lever 156a might be limited and if the operator attempted to shift it to the end of its normal range severe strains would be imposed upon the linkage connecting it to its associated lever 143. To prevent such strains, I prefer to insert in the cable 155a a resilient lost motion device 70 which is illustrated in detail in Fig. 8. Thus it comprises a sleeve member 71 connected at one end by a clevis pin 72 to the rod 16a and adapted to receive within its hollow body a plunger 73 on the end of a rod 74, which in turn is attached by a turn buckle 75 and clevis pin 76 to the end of the other section of the rod 16a. The rod 74 passes through a bushing 77 threaded into the sleeve 71 and the plunger 73 is positioned between a pair of helical springs 78 and 79 mounted within the hollow portion of the sleeve 71, the opposite ends of the springs bearing against the inner end of the hollow portion of the body 71 and against the bushing 77, respectively. The springs 78 and 79 are sufficiently stiff to normally transmit all movement of the lever 156a to the associated bell crank lever 17 while permitting lost motion and further movement of the lever 156a when the bell crank lever has reached the limit of its motion.

Although the invention has been described in detail with reference to a bi-motor airplane, the application of the essential principles of the invention to other multi-engine planes having any number of engines or to motor-boats and other devices containing engines to be synchronized, will be obvious to those skilled in the art and the invention is therefore to be limited only as set forth in the appended claims.

I claim:

1. In combination in a multi-engine craft, a plurality of engines each having an independent throttle for controlling the power output thereof, a variable pitch propeller for each engine, means for coupling each engine to its associated propeller, independent governor means for each engine for varying the pitch of the propeller associated with that engine in response to variations in speed of the engine whereby the load on each engine is automatically varied in response to changes in the power developed by the engine, to maintain the speed of each engine within predetermined narrow limits, differential means connected to said two engines and comprising a shaft rotatable in response to variations from a predetermined speed relation between said two engines, and means actuated in response to rotation of said shaft to vary the setting of one of said governors in such a direction as to restore said predetermined speed relation.

2. In a mechanism for synchronizing the speed of a controlled engine with the speed of a master engine, a centrifugally actuated governor on each engine, a differential mechanism disposed between said engines and having its opposite sides driven by said engines, and a displaceable member operatively connected with the governor of said controlled engine and associated with said differential mechanism to be displaced by said differential mechanism upon a variation in the speed of the controlled engine with respect to the speed of the master engine.

3. In a mechanism for synchronizing the speed of a controlled engine with that of a master engine, a centrifugally actuated governor upon each engine, a manual control for each governor, a differential mechanism disposed between said engines and driven thereby, and means associated with said differential mechanism and actuated thereby upon a variation in the speed of the controlled engine with respect to the speed of the master engine interposed in the manual control to said controlled engine to vary the action of the controlled engine governor upon a variation in the speed of the controlled engine with respect to the speed of the master engine.

4. In a mechanism for synchronizing the speed of a controlled engine with that of a master engine, a governor for each engine, a manual control for each governor, means connecting each manual control with the respective governor, a differential mechanism interposed between said engines and driven thereby, and means applied to the first mentioned connecting the governor of said controlled engine with its respective manual control and actuated by said differential mechanism upon a variation in the speed of said controlled engine with respect to the speed of said master engine to vary the action of the governor of said controlled engine without varying the manual control for said controlled engine.

5. In a mechanism for synchronizing the speed of a controlled engine with the speed of a master engine, a centrifugally actuated governor on each engine, means for manually varying the setting of the governor on said master engine, a differential mechanism disposed between said engines and having its opposite sides driven by said engines, and a displaceable member operatively connected with the governor of said controlled engine and associated with said differential mechanism to be displaced by said differential mechanism upon a variation in the speed of the controlled engine with respect to the speed of the master engine to vary the setting of the governor on the controlled engine.

SILAS A. MOREHOUSE.